June 29, 1926.

C. D. BOYNTON

ANIMAL TRAP

Filed July 14, 1925

1,590,879

Inventor
Clarence D. Boynton,
By
Attorney

Patented June 29, 1926.

1,590,879

UNITED STATES PATENT OFFICE.

CLARENCE D. BOYNTON, OF NORWICH, CONNECTICUT.

ANIMAL TRAP.

Application filed July 14, 1925. Serial No. 43,591.

My said invention relates to an animal trap designed particularly for catching woodchucks and it is an object of the invention to provide a trap which will not arouse a premonition of danger or fright in the animal about to enter the same but through which such animal may have almost unobstructed view.

Another object of the invention is to provide a trap in which the working parts are protected from the action of the weather and which is simple in construction and inexpensive to manufacture.

Figure 1:
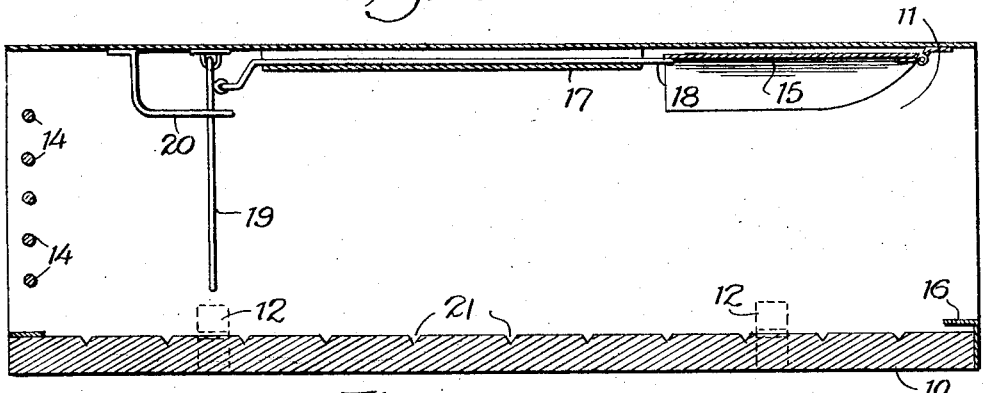
Figure 2:
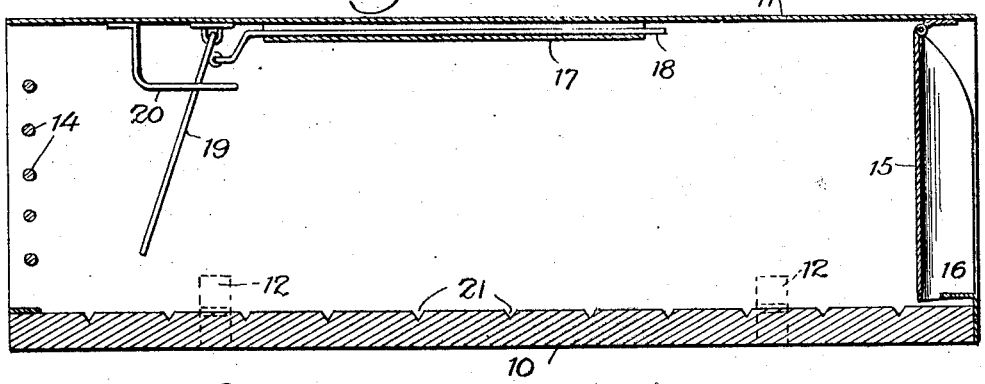
Figure 3:
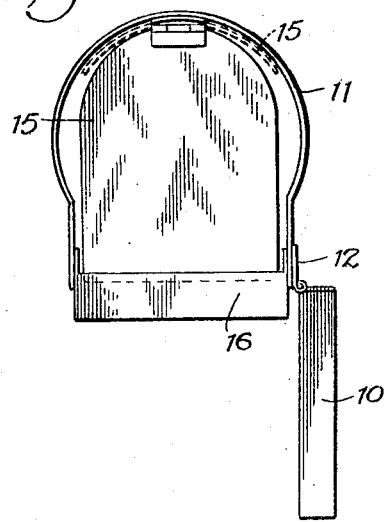
Figure 4:
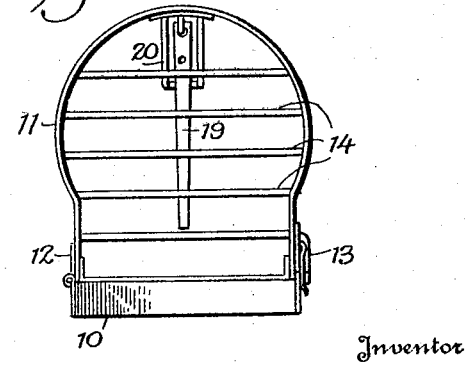

Referring to the accompanying drawings which are made a part hereof and on which similar reference characters indicate similar parts, Figure 1 is a longitudinal section showing the parts in set position, Figure 2, a similar view showing the trigger moved and the trap door closed, Figure 3, a front end elevation with the bottom in unlatched position, and Figure 4, a rear end view.

As shown in the drawings the device comprises an elongated base 10 upon which is mounted an elongated body 11 having a curved upper portion secured by means of hinges 12 to one edge of the base and being provided with a latch 13 at the opposite edge for fastening the parts together. The rear end of the body 11 is provided with an obstruction for the passage of an animal through the body in the form of spaced bars 14. The front end of the body is provided with a trap door 15 pivoted at its upper end to the top and curved to conform to the curvature of the top portion to which it is pivoted. This trap door is swingable by gravity from horizontal to vertical position and an obstruction 16 is secured to said body across said base and outwardly of the vertical or closed position of the trap door to prevent the door from being opened outward.

Any desired trigger mechanism may be employed, however, in the present instance I secure a tube 17, preferably of a non-corrodible material, longitudinally within the upper portion of the body with one end spaced slightly from the bottom end of the door when said door is raised to the horizontal or set position. In order to secure the door 15 in set position I provide a rod or bar 18 in the tube 17 longitudinally slidable to a position to engage the bottom end of the door and maintain it in horizontal position as shown in Fig. 1. Adjacent the opposite end of the tube 17 I provide a trigger 19 pivoted at its upper end to swing in the longitudinal axis of the body 11 and to which is connected the offset end of the bar 18. In order to prevent sidewise movement of the trigger 19 I provide a substantially U-shaped guide 20 which has its legs extending on opposite sides and around the trigger 19.

In the above construction when the parts are in the position shown in Fig. 1 an almost unobstructed view is permitted through the trap particularly as the door 15 when raised is shaped to fit snugly within the top of the body, there being only a few bars 14 at the rear end of the trap and the depending trigger 19 with its guide 20 to be observed, which will not arouse apprehension on the part of an animal entering the same. Only a very slight movement of the trigger will be necessary to impart sufficient longitudinal movement to the bar 18 to cause the same to be disengaged from the top so that said door may drop to the vertical position shown in Figure 2.

In setting this trap I find it advisable and desirable to place the front end of the trap within the passageway or entrance leading from the home or rendezvous of the animal desired to be captured and as this necessitates placing the trap at an angle I provide grooves 21 in the upper surface of the base 10 to form a better tread for the animal. I also find it sometimes desirable to provide a thin covering of earth or leaves on the upper surface of the base or floor of the trap which will not interfere with the operation of the door but will permit the same to effectively close the entrance into the trap.

In a trap of this nature there are no springs, the danger of maiming or torturing an animal is eliminated, the parts are simple and efficient and at the same time are protected from the weather.

It will be obvious to those skilled in the art that various changes may be made in my device without departing from the spirit of the invention and therefore I do not limit myself to what is shown in the drawings and described in the specification but only as indicated in the appended claims.

Having thus fully described my said invention, what I claim as new and desire to secure by Letters Patent, is:

1. A trap comprising an elongated base having grooves extending transversely of its upper surface and forming a friction tread, a body pivoted at one side on said base and having fastening means on its opposite side said body having a curved top, bars extending across and forming an obstruction at one end of said body, a trap door pivoted in the opposite end of the body to the top and adapted to be secured in a substantially horizontal position to permit free access into the body and adapted to be released to permit the door to swing downwardly and substantially close the passage through the body said door being curved to conform to the curvature of the top, a tube secured longitudinally within the body to the top, a bar slidable in said tube into position to engage under the edge of said door when in elevated position, a trigger element pivoted adjacent the end of said tube remote from the door and having pivoted connection with said bar whereby when the trigger element is swung on its pivot the bar will be moved longitudinally to permit the trap door to swing to its closed position, substantially as set forth.

2. A trap comprising a body having a curved top, an obstruction at one end of said body, a trap door pivoted to the top in the opposite end of the body and adapted to be secured in a substantially horizontal position to permit free access into the body and adapted to be released to permit the door to swing downwardly and substantially close the passage through the body said door being curved to conform to the curvature of the top, a tube secured longitudinally within the body to the top, a bar slidable in said tube into position to engage under the edge of said door when in elevated position, a trigger element pivoted adjacent the end of said tube remote from the door, a guide for said trigger, pivoted connection between said trigger and said bar whereby when the trigger element is swung on its pivot the bar will be moved longitudinally to permit the trap door to swing to its closed position, substantially as set forth.

In witness whereof, I have hereunto set my hand and seal at Norwich, Connecticut this thirteenth day of July, A. D. nineteen hundred and twenty-five.

CLARENCE D. BOYNTON. [L. S.]